(12) United States Patent
Valette et al.

(10) Patent No.: US 9,257,831 B2
(45) Date of Patent: Feb. 9, 2016

(54) ELECTRICAL CIRCUIT FOR CUTTING OFF AN ELECTRIC POWER SUPPLY COMPRISING TRANSISTORS AND FUSES HAVING REDUNDANT LOGIC

(71) Applicant: SAGEM DEFENSE SECURITE, Boulogne-Billancourt (FR)

(72) Inventors: Patrick Valette, Boulogne-Billancourt (FR); Francois Guillot, Boulogne-Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 0 days.

(21) Appl. No.: 14/410,020

(22) PCT Filed: Jun. 20, 2013

(86) PCT No.: PCT/EP2013/062891
§ 371 (c)(1),
(2) Date: Dec. 19, 2014

(87) PCT Pub. No.: WO2013/190044
PCT Pub. Date: Dec. 27, 2013

(65) Prior Publication Data
US 2015/0194803 A1 Jul. 9, 2015

(30) Foreign Application Priority Data
Jun. 21, 2012 (FR) ...................... 12 55873

(51) Int. Cl.
*H02H 3/36* (2006.01)
*H02H 3/20* (2006.01)
*B64D 47/00* (2006.01)

(52) U.S. Cl.
CPC ................. *H02H 3/36* (2013.01); *B64D 47/00* (2013.01); *H02H 3/202* (2013.01)

(58) Field of Classification Search
CPC ...................................................... Y10T 307/76
USPC ................................................... 307/115, 326
See application file for complete search history.

(56) References Cited

U.S. PATENT DOCUMENTS

| | | | | | |
|---|---|---|---|---|---|
| 4,001,654 A | * | 1/1977 | Davis | ...................... | F01D 21/20 307/115 |
| 4,159,496 A | * | 6/1979 | Stevens | .................. | A61G 7/018 307/115 |
| 7,304,406 B2 | * | 12/2007 | Behringer | ............ | H01H 47/005 307/326 |
| 8,203,234 B2 | * | 6/2012 | Lee | ....................... | H02J 7/0031 307/326 |

FOREIGN PATENT DOCUMENTS

WO WO 2008/113337 A2 9/2008
WO WO 2011/157834 A2 12/2011

OTHER PUBLICATIONS

Written Opinion of the International Searching Authority from PCT/EP2013/062891 dated Dec. 23, 2014 (7 pages).

* cited by examiner

*Primary Examiner* — Fritz M Fleming
(74) *Attorney, Agent, or Firm* — Blakely Sokoloff Taylor & Zafman LLP

(57) ABSTRACT

The invention relates to an electric circuit suitable for cutting off an electric power supply of an electric device, the circuit including an electrical device and a supply voltage source of the electrical device, also having as inputs at least two discrete electrical signals, the values of which condition the cutting off of the electric power supply of the device, the electric circuit being characterized in that same includes: at least two modules for cutting of the electric power supply connected between the voltage source and the electrical device, each module tar cutting off the electric power supply being controlled in accordance with the values of the discrete electrical signals; and at least two modules for comparing discrete electrical signals in parallel, in which at least one of the modules for cutting off the electric power supply is controlled by the outputs of the modules for comparing discrete signals.

10 Claims, 3 Drawing Sheets

ELECTRICAL CIRCUIT FOR CUTTING OFF AN ELECTRIC POWER SUPPLY COMPRISING TRANSISTORS AND FUSES HAVING REDUNDANT LOGIC

GENERAL TECHNICAL FIELD

The invention concerns the field of the safety of control of systems or equipments, in particular electronic, and especially those on board an aircraft.

PRIOR ART

An electrical system can be controlled after a condition is satisfied.

One known solution is to connect the power supply of the electrical system to an electrical circuit configured so as to test discrete signals indicating that a condition is satisfied.

For example, in the case of an aircraft, some electrical equipments must be cut off in flight, for example, in the case of a system for acquiring, processing and communicating avionic data, the wireless-transmission radio module must be cut off so as not to interfere with the functioning of the aircraft.

By means of logic AND gates connected to switches it is possible simply to cut off the power supply to the radio module if necessary.

Such a solution is however not satisfactory when particularly high safety levels are required. For example the reliability levels required for the power supply to the electrical equipment presenting a catastrophic risk are the order of $10^{-9}$·risk of transmission per hour of flight.

PRESENTATION OF THE INVENTION

The invention proposes to overcome at least one of these drawbacks.

To this end, the invention proposes an electrical circuit suitable for cutting off an electric power supply to electrical equipment, the circuit comprising electrical equipment and a voltage source supplying the electrical equipment, and furthermore having for inputs at least two discrete electrical signals, the values of which determine the cutting off of the electrical power supply to the equipment, the electrical circuit being characterised in that it comprises:
  at least two modules for cutting off the electric power supply connected in series, connected between the voltage source and the electrical equipment, each module for cutting off the electric power supply being controlled according to the values of the discrete electrical signals, and
  at least two modules for comparing the discrete electrical signals in parallel, in which at least one of the modules cutting off the electric power supply is controlled by the outputs of the modules comparing the discrete signals.

The invention is advantageously supplemented by the following features, taken alone or in any technical possible combination thereof:
  the first module cutting off the electric power supply is suitable for generating a short-circuit in the event of divergence between the signals issuing from the modules comparing the discrete electrical signals;
  it comprises at least one fuse for, in the event of a short-circuit, isolating the voltage source from the elements of the circuit;
  the modules cutting off the electric power supply have different electronic structures;
  it comprises three successive pairs of switches, each pair of switches comprising two switches connected in series, each pair of switches being connected in parallel between the output of the first switch in the upstream pair and earth, and in which the switches of each pair are controlled by a function of a discrete electrical signal, and functioning in opposite ways with respect to each other according to the command;
  the pairs of switches are suitable for causing a short-circuit as soon as a switch in at least one pair has a fault in "permanent conductor" mode;
  the module cutting off the electric power supply controlled by the outputs of the modules comparing the discrete signals comprises three switches connected in parallel between the voltage source and earth, each switch being controlled by a logic function of the electrical output signals of the modules comparing the discrete electrical signals;
  the logic function of the electrical output signals of the modules comparing the discrete electrical signals is a logic OR function;
  the modules comparing the discrete electrical signals have different electronic structures, suitable for implementing the exclusive OR logic function on the values of the discrete electrical signals input, the exclusive OR logic function preferably being implemented in negative or positive logic.

The invention also concerns a system for acquiring, processing and communicating avionic data, comprising an electrical circuit according to the invention.

The circuit of the invention comprises several components, the safety level of the circuit is around $10^{-9}$ risk of supplying the equipment per hour of flight. In addition, by using several stages that can interact according to their state, it is ensured that the circuit is robust to faults that may affect the components while making it possible to supply the electrical equipment only in the case where it must be. The safety levels put in series mean that a sum of successive conditions are required for the uncovenanted powering up of the equipment to result: simultaneous failure of the cutoff modules, simultaneous failure of the comparison modules.

PRESENTATION OF THE FIGURES

Other features, aims and advantages of the invention will emerge from the following description, which is purely illustrative and non-limitative, and which must be read with regard to the accompanying drawings, in which.

DETAILED DESCRIPTION OF THE INVENTION

Figure 1:
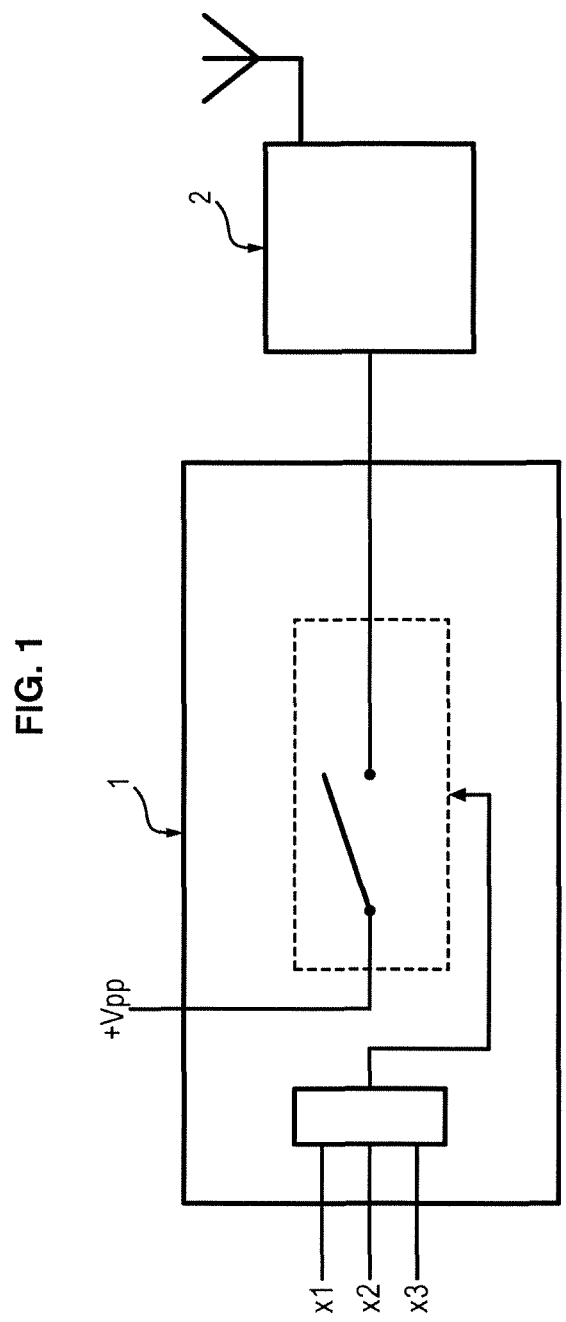
FIG. 1 illustrates a system for acquiring, processing and communicating avionic data in accordance with an embodiment of the invention.

In relation to FIG. 1, a system for acquiring, processing and communicating avionic data comprises:
  a unit (not shown) for acquiring discrete electrical signals x1, x2, x3 indicating a state of the aircraft;
  a radio module 2 suitable for transferring the avionic data from the system to a remote station;
  a voltage source +Vpp supplying the radio module 2, and an electrical circuit 1 for the electric power supply to the radio module 2 that makes it possible to cut off the supply to the radio module 2 when the aircraft is in flight.

A state of the aircraft is for example in flight, on the ground, etc. When the aircraft is on the ground, discrete electrical signals indicating that the aircraft has landed are for example: a signal indicating the existence of a weight of the aircraft on the wheels, or a signal indicating that the doors of the aircraft are open.

The electric power supply circuit may be modelled by a switch controlled by a logic function of the discrete electrical signals (see FIG. 1).

Logic function means a series of logic operations with one or more variables. Known logic functions are: AND, OR, exclusive OR (XOR), etc.

Figure 2:
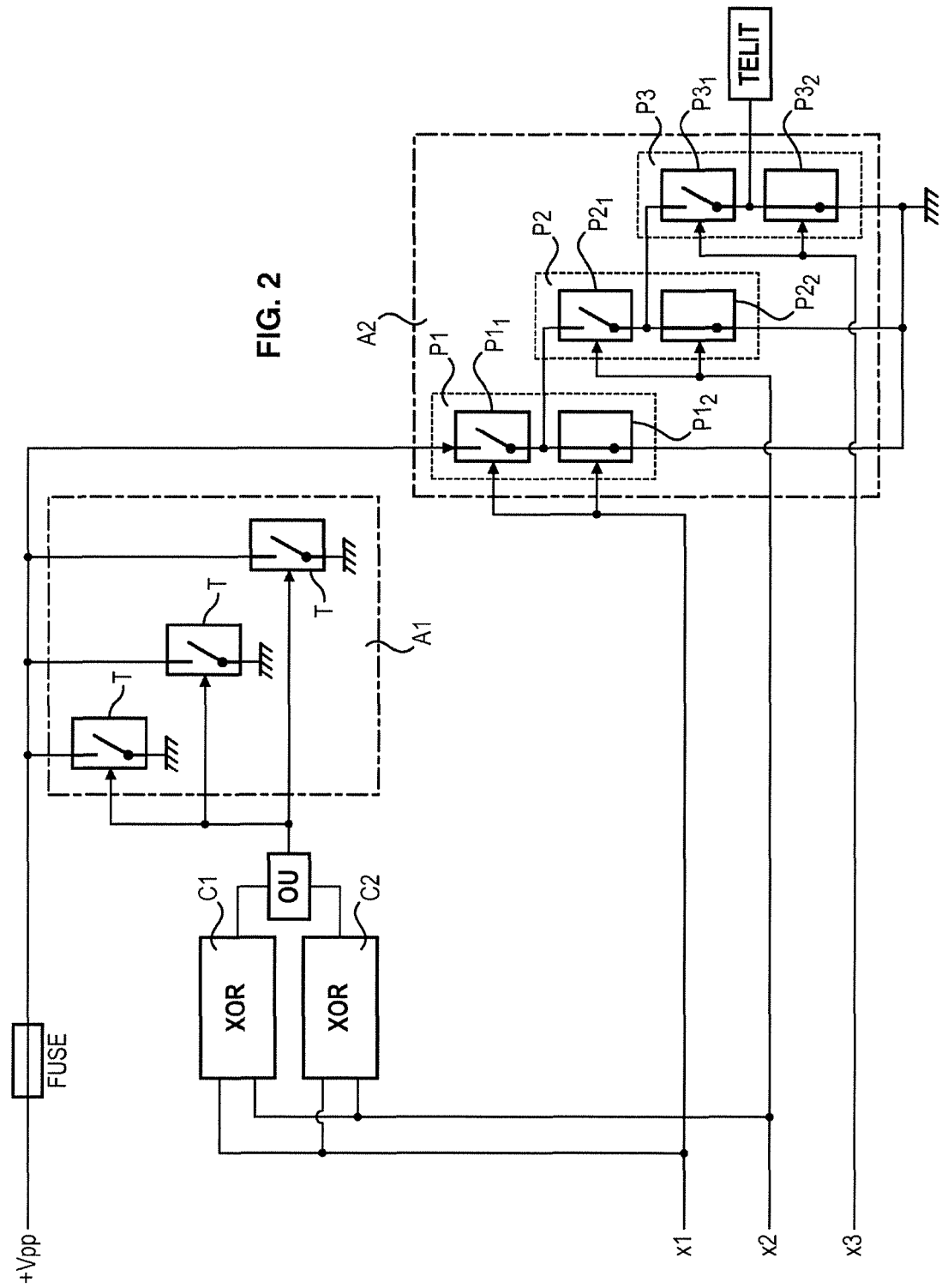
FIG. 2 illustrates an outline diagram of an electrical circuit in accordance with an embodiment of the invention.

In relation to FIG. 2, the electrical circuit 1 receives as an input at least two discrete electrical signals, preferably three discrete electrical signals x1, x2, x3, and comprises a voltage source +Vpp. The values of the discrete electrical signals determine the electric power supply to the radio module 2. In this case, in the embodiment in FIGS. 2 and 3, the discrete electrical signals must both be equal to 1 for the radio module 2 to be supplied.

Naturally, it is possible to envisage an electrical circuit receiving as an input a higher number of discrete electrical signals.

The electrical circuit makes it possible, in normal operation, to provide the electric power supply to the electrical equipment 2 according to the values of the discrete electrical signals.

The logic values of the discrete electrical signals are considered below. In particular, it is considered that a discrete electrical signal has a high state, that is to say a logic 1 value, if it represents a condition according to which the electrical equipment can be supplied (for example if the aircraft has landed), and that it has a low state, that is to say a logic 0 value, if it represents a condition according to which the electrical equipment must not be supplied.

Figure 3:
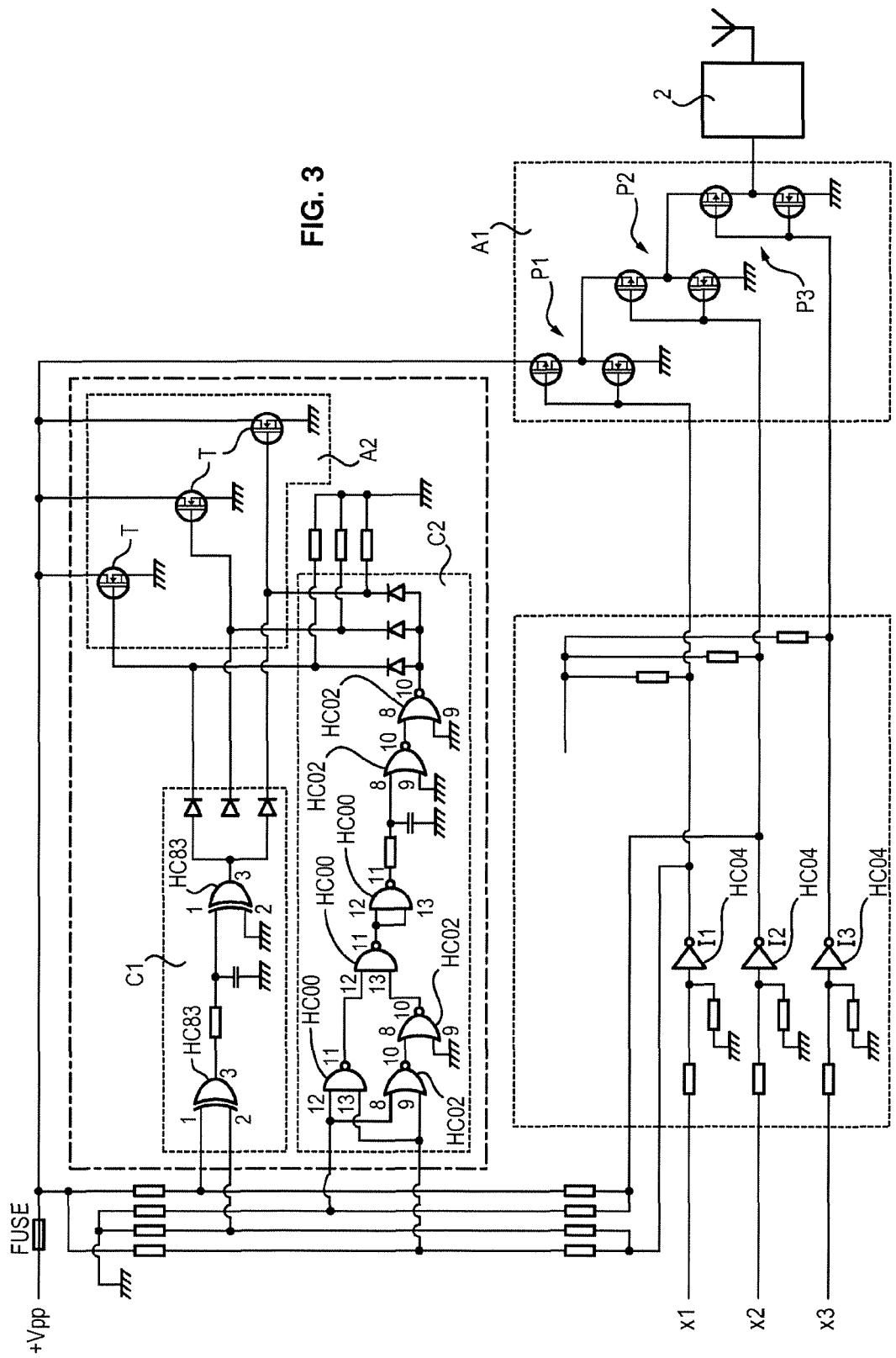
FIG. 3 illustrates a diagram of an electrical circuit in accordance with an embodiment of the invention.

In relation to FIGS. 2 and 3, it is considered that the discrete electrical signals must all three be at the high state if the electrical equipment 2 is to be supplied.

As will be described hereinafter, if only one component is used for testing the values of the discrete signals, it has a probability of failure that is not insignificant so that the electrical equipment is supplied whereas it should not be.

To overcome this problem, the electrical circuit has several stages that interact with one another. At each stage, it is possible to prevent a failure of the components that has a state inconsistent with the discrete signals.

This makes it possible to reduce the probability of supplying the electrical equipment when it should not be.

This is because the probability of failure of the circuit must be around $10^{-9}$ whereas an electronic component alone has a probability of failure of around $10^{-6}$.

The electrical circuit comprises two modules for cutting off the electric power supply A1, A2 connected in series, each module being controlled according to the values of the discrete electrical signals.

The cutoff modules A1, A2 are connected between the voltage source +Vpp and the electrical equipment 2.

Advantageously, the two modules A1, A2 for cutting off the electric power supply have different electronic structures, so as to verify the values of the discrete electrical signals, by means that are different and therefore not liable to fail identically, and thus so as to reduce the probability of supply of the electrical equipment in error.

The electrical circuit further comprises two modules C1, C2 for comparing the discrete electrical signals disposed in parallel. The comparison modules received as an input are discrete electrical signals, the output of the modules being an electrical signal having a high state ("1") or a low state ("0").

First Power-Supply Cutoff Module

One of the power-supply cutoff modules, advantageously the module A1 disposed furthest upstream, is controlled by the output electrical signals of the modules C1, C2 comparing the discrete electrical signals.

This power-supply cutoff module A1 comprises three switches T in parallel, connected between the output of the supply voltage source +Vpp and the ground. These switches T are advantageously CMOS transistors.

These three switches T receive as an input the same signal, which is a logic function of the output electrical signals of the modules C1, C2 comparing the discrete electrical signals, advantageously the logic OR function. The electrical signal issuing from the comparison module is a logic signal having a high state ("1") or a low state ("0").

The redundancy of the switches, in the event of failure of one of the switches T, maintains the correct functioning of the cutoff module A1.

With reference to FIG. 3, the switches are advantageously CMOS transistors such that:
if they are controlled by a signal at 1, the transistors are closed,
if they are controlled by a signal at 0, they are open.

Closure of one of the switches when it receives as an input an electrical signal at the high state ("1") isolates the electrical equipment 2 from the voltage source +Vpp and causes a short-circuit. The circuit 1 then advantageously comprises a fuse FUSE, isolating the voltage source from the other elements of the circuit in the event of short-circuit.

Returning to FIG. 2, the modules C1, C2 comparing the values of the discrete electrical signals both use the exclusive OR, or XOR, logic function between two discrete electrical signals x1 and x2.

Advantageously, the comparison modules C1, C2 have different electronic structures in order to implement this logic function, so as to eliminate common failure modes and thus create a more reliable redundancy of information than if the logic function were calculated identically.

For example, the logic function may be implemented in one of the modules, in this case in the module C1, by a positive logic, and in the other module, in this case the module C2, by a negative logic.

More precisely, the module C1 comprises a first "exclusive OR" logic gate between the two discrete electrical signals x1, x2, the output of which is filtered by a low-pass filter of the RC type, the filtered output being an input of a second "exclusive OR" logic gate, the other input of which is connected to earth.

As for the module C2, this comprises a "NAND" logic gate and a "NOR" logic gate in parallel, each having as their inputs the two discrete electrical signals. The output of the "NOR" logic gate is an input of another "NOR" logic gate, the other input of which is connected to earth.

The output of the "NAND" logic gate constitutes an input of a new "NAND" logic gate, the other input of which is the output of the second "NOR" logic gate.

The output of the second "NAND" logic gate is then duplicated in order to constitute the two inputs of a third "NAND" logic gate. The output of this gate is filtered by a low-pass filter of the RC type, the filtered output constituting an input of a third "NOR" gate, the other input of which is connected to earth.

Finally, the output of the third "NOR" gate is itself the input of a fourth "NOR" gate, the second input of which is connected to earth.

Each output of one of the modules is detripled in order to be compared with the output of the other module, the logic OR function at the output of the modules not being shown in the figure.

As stated previously, in the present case the discrete electrical signals must all be at the high ("1") state in order to enable supply of the electrical equipment 2 by the voltage source.

Non-limitatively, each discrete electrical signal can be inverted initially by an inverter I1, 12, before supplying the comparison modules C1, C2 (see FIG. 3).

The previously described structure of the comparison modules C1, C2 makes it possible to obtain the following functioning:

- if the two discrete electrical signals x1, x2 are both at the high ("1") state or both at the low ("0") state, the comparison modules C1, C2 both deliver an electrical signal at the low ("0") state so that all the transistors T are open, and do not cut off the supply to the electrical equipment;
- if one of the discrete electrical signals is at the high ("1") state and the other at the low ("0") state, the modules C1 and C2 both deliver an electrical signal at the high ("1") state so that all the transistors are closed, giving rise to a short-circuit and cutting off the supply to the module TELIT.

If a fault in a component of one or other of the comparison modules C1, C2 gives rise to a divergence between the output signals of the comparison modules C1 and C2, each transistor T receives an electrical signal at the high ("1") state, thus causing a short-circuit and cutting off the supply to the electrical equipment 2.

As will have been understood, a short-circuit is generated in the case of divergence between the signals issuing from the comparison modules C1, C2. A divergence caused either by the fact that the discrete electrical signals are different or by a failure of the components of the comparison modules.

Second Power-Supply Cutoff Modules

In FIG. 2, the second cutoff module A2 of the circuit 1 comprises as many successive pairs of switches as there are discrete electrical signals input to the circuit. In this case, it comprises three pairs P1, P2, P3 of successive switches.

Each pair of switches Pi comprises two switches Pi1, Pi2 in series, and each pair from the second is connected in parallel between the output of the first switch of the pair disposed upstream, and the ground. The first pair receives as an input the power supply voltage +Vpp, if this has not been cut off by the first cutoff module A1 situated upstream.

Each switch is advantageously implemented by a CMOS transistor controlled by a function of a corresponding discrete xi, so that, if the discrete xi has a value in accordance with a value that controls the supply to the equipment 2, the first switch is conductive and the second switch is open.

In the case illustrated in FIG. 2, the cutoff module A2 enables supply to the electrical equipment when the discrete electrical signals are in the high ("1") state, it is necessary for the first transistor in each pair to be conductive when it is controlled by an input at the low ("1") state, and for the second then to be open.

The cutoff module A2 therefore controls the value of each discrete electrical signal xi, and enables supply to the electrical equipment when all the discrete signals have the value enabling control of the supply to the electrical equipment.

On the other hand, if one of the discrete electrical signals is not in accordance with the value required for enabling supply to the equipment, the first switch in the corresponding pair opens in order to block the supply.

Furthermore, in the case of failure of one of the components of the power-supply cutoff module A2, for example if a switch P1 is closed instead of being open, the cascade of switch pairs prevents the module from being supplied.

In addition, in the association of the pairs Pi1 and Pi2, when Pi1 has a failure in "permanent open" mode, this prevents the electrical equipment from being supplied whatever the command for the discrete electrical signals x1, x2 or x3. Conversely, when Pi1 has a fault in "permanent closed" mode, and the discrete electrical signals x1, x2 or x3 are in a position not to supply the electrical equipment, then the Pi2s will be controlled so as to be conductive and will cause a short-circuit that will destroy the fuse FUSE, isolating the electrical equipment from the supply source.

The result of this electronic circuit 1 is that the failure of one of the components of a circuit does not cause supply to the module by the voltage source.

The invention claimed is:

1. Electrical circuit suitable for cutting off an electric power supply to electrical equipment, the circuit comprising electrical equipment and a voltage source supplying the electrical equipment, and furthermore having for inputs at least two discrete electrical signals, the values of which determine the cutting off of the electrical power supply to the equipment, Wherein the electrical circuit comprises:

at least two modules (A1, A2) for cutting off the electric power supply connected in series, connected between the voltage source and the electrical equipment, each module for cutting off the electric power supply being controlled according to the values of the discrete electrical signals, and at least two modules (C1, C2) for comparing the discrete electrical signals in parallel, in which at least one of the modules (A1, A2) cutting off the electric power supply is controlled by the outputs of the modules (C1, C2) comparing the discrete signals.

2. Electrical circuit according to claim 1, in which the first module (A1) cutting off the electric power supply is suitable for generating a short-circuit in the event of divergence between the signals issuing from the modules (C1, C2) comparing the discrete electrical signals.

3. Electrical circuit according to claim 2, further comprising at least one fuse (FUSE) in the event of a short-circuit, isolating the voltage source from the elements of the circuit.

4. Electrical circuit according to claim 1, in which the modules cutting off the electric power supply have different electronic structures.

5. Electrical circuit according to the preceding claim, comprising three successive pairs of switches (P1, P2, P3), each pair of switches comprising two switches (P1$_1$, P1$_2$, P2$_1$, P2$_2$, P3$_1$, P3$_2$) connected in series, each pair of switches being connected in parallel between the output of the first switch in the upstream pair and the ground, and in which the switches of each pair are controlled by a function of a discrete electrical signal, and functioning in opposite ways with respect to each other according to the command.

6. Electrical circuit according to claim 5, in which the pairs of switches are suitable for causing a short-circuit as soon as a switch in at least one pair has a fault in "permanent conductor" mode.

7. Electrical circuit according to claim 1, in which the module (A1) cutting off the electric power supply controlled by the outputs of the modules comparing the discrete signals comprises three switches (T) connected in parallel between the voltage source and the ground, each switch being controlled by a logic function of the electrical output signals of the modules comparing the discrete electrical signals.

8. Electrical circuit according to the preceding claim, in which the logic function of the electrical output signals of the modules comparing the discrete electrical signals is a logic OR function.

9. Electrical circuit according to claim 1, in which the modules (C1, C2) comparing the discrete electrical signals have different electronic structures, suitable for implementing the exclusive OR logic function on the values of the discrete electrical signals input, the exclusive OR logic function preferably being implemented in negative or positive logic.

10. System for acquiring, processing and communicating avionic data, comprising an electrical circuit according to claim 1.

* * * * *